(12) United States Patent
Reetz et al.

(10) Patent No.: US 10,137,616 B2
(45) Date of Patent: Nov. 27, 2018

(54) FABRICATING LIGHTWEIGHT SKIN SYSTEMS FOR LARGE SCALE ROBOTIC CHARACTERS

(71) Applicant: DISNEY ENTERPRISES, INC., Burbank, CA (US)

(72) Inventors: Daniel Reetz, North Hollywood, CA (US); Philip John Jackson, Glendale, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 1292 days.

(21) Appl. No.: 14/040,901

(22) Filed: Sep. 30, 2013

(65) Prior Publication Data

US 2015/0091215 A1 Apr. 2, 2015

(51) Int. Cl.
B29C 59/16 (2006.01)
B23K 26/361 (2014.01)
B29C 44/56 (2006.01)
B23K 26/362 (2014.01)
(Continued)

(52) U.S. Cl.
CPC ............ *B29C 44/56* (2013.01); *B23K 26/046* (2013.01); *B23K 26/361* (2015.10); *B23K 26/362* (2013.01); *B29C 59/16* (2013.01); *B23K 2103/42* (2018.08); *B23K 2103/50* (2018.08)

(58) Field of Classification Search
USPC ......................................... 703/1, 2; 264/400
See application file for complete search history.

(56) References Cited

U.S. PATENT DOCUMENTS 4,099,271 A * 7/1978 Allen ..................... A41G 7/00
2/200.2
6,008,468 A * 12/1999 Tanaka ............... B23K 26/0823
219/121.7
(Continued)

FOREIGN PATENT DOCUMENTS

FR 2974767 11/2012

OTHER PUBLICATIONS

"Laser Cutting Machine" retrieved on Sep. 5, 2013 from http://www.inlay.com/cnc/laser/.
(Continued)

*Primary Examiner* — Jeffrey M Wollschlager
*Assistant Examiner* — Armand Melendez
(74) *Attorney, Agent, or Firm* — Marsh Fischmann & Breyfogle LLP; Kent A. Lembke

(57) ABSTRACT

A method of fabricating a skin system or its elements using a laser cutter. The laser cutter is controlled to perform multiple passes to selectively cut away layers of material on a surface of a sheet of cellular foam materials. Each layer of material to be removed is defined by a cut or texture pattern. The laser cutter is operated to cut deeper with each layer of material removed by setting a different resolution for the laser cutter for each layer. For example, a laser cutter may be selectively controlled to operate within a resolution range, and each layer defined by the same or different cut pattern is cut using a different resolution. The method includes associating lower resolution settings for the first or outer layers to remove a first depth of material from the skin sheet's surface and associating higher and higher resolution settings for additional layers.

21 Claims, 5 Drawing Sheets

(51) Int. Cl.
*B23K 26/046* (2014.01)
*B23K 103/00* (2006.01)

(56) References Cited

U.S. PATENT DOCUMENTS

| | | | | |
|---|---|---|---|---|
| 6,090,529 | A | * | 7/2000 | Gelbart .................... B41C 1/05 430/271.1 |
| 7,919,036 | B2 | | 4/2011 | Bauer |
| 8,229,589 | B2 | | 7/2012 | Filip |
| 2006/0202371 | A1 | | 9/2006 | Ehbing et al. |
| 2008/0235850 | A1 | * | 10/2008 | Cabauy ............ A41D 19/01558 2/161.8 |
| 2012/0305003 | A1 | * | 12/2012 | Mark .................... A61M 16/06 128/206.24 |
| 2013/0065041 | A1 | | 3/2013 | Wisniewski et al. |
| 2013/0211390 | A1 | * | 8/2013 | Bor ........................ A61F 9/008 606/5 |
| 2013/0270269 | A1 | * | 10/2013 | Lewis .................... B41M 5/24 220/270 |

OTHER PUBLICATIONS

"Laser Engraver Machine: Lee" retrieved on Sep. 5, 2013 from http://siampw.cim/en/p_Laser-Engraver.php?p=lee.
"High-Power Density-Focusing Optics" retrieved on Sep. 5, 2013 from http://www.ulsinc.in/products/features/hpdfo/.

* cited by examiner

FABRICATING LIGHTWEIGHT SKIN SYSTEMS FOR LARGE SCALE ROBOTIC CHARACTERS

BACKGROUND

1. Field of the Description

The present description relates, in general, to systems and methods for fabricating skins or skin systems for use with robotic and other characters, and, more particularly, to a method (and system for implementing such a method) of fabrication for creating lightweight but durable skin systems for robotic or animatronic characters in a manner that is easily repeatable (e.g., allows an identical skin to be formed over and over), is useful with relatively large characters or figures, and is suited for quick and effective modifications to a skin system design (e.g., when a designer wants to change the stiffness, the outer texture, or another skin parameter, the method allows changes to be made in a simple, timely, and inexpensive manner).

2. Relevant Background

Durable materials that are often also flexible and elastic such as plastics and rubbers are used in many applications to create coverings or skins that are applied over an internal physical support structure or skeleton. For example, skins or skin systems are used to create realistic models of humans, animals, and characters, and, when combined with robotics, such models may accurately simulate live beings.

Robotics involves the design and use of robots to provide programmable actuators or drivers to perform tasks without human intervention, and there have been significant demands for robotic devices (or robots as these terms may be used interchangeably) that simulate humans, animals, and other living beings or characters. These robotic characters are relied upon heavily in the entertainment industry, such as to provide special effects for movies and television and to provide robots for use in shows and displays in amusement or theme parks. For example, robotics may be used to provide a character in a theme park ride or show that repeats a particular set of movements or actions (e.g., programmed tasks) based on the presence of guests or a ride vehicle or another triggering event.

While many advances have been made in realistically simulating the physical movement and facial movement of a character, problems with maintaining a realistic or desired movement or facial animation still occur when the robotics (e.g., internal components of a robot including mechanical/structural portions as well as software, hardware, power systems, and the like) are covered with a skin or skin system. For example, a robot used to simulate a particular creature would be covered with skin or a covering assembly to imitate the natural or desired covering for the creature such as skin and fur/hair for many creatures, clothes for some creatures such as humans or characters (e.g., characters from animated films or television or puppets), or a more fanciful covering system such as a metallic suit or any other desired covering. In simulating humans or human-like characters, the robotics are typically covered in a skin that is fabricated of flexible material to move naturally with the underlying robotics. The skin may be formed of a rubber material or a silicone that is attached or anchored to the mechanical actuators or drivers of the robotic system, and the skin is configured to have an outward appearance similar to the character or creature being simulated by the robot. To simulate animals or characters that may be real or imagined, the outer surfaces of the skin may be designed with a patterned or textured outer surface, e.g., to have scales or other features.

Typically, a skin system for a robot is made using a manual process relying on skill and experience of the craftsperson creating the skin and requiring many man-hours to prototype and later fabricate based on the prototype. In an exemplary process, a sculpture is created, such as from clay or other moldable/shapeable materials, to represent the exterior skin shape (e.g., a person's face, a character from a movie, and so on). The sculpture is then molded, and sheet wax or a layer of clay is laid by hand into this exterior mold to define a desired thickness for the exterior skin layer. An interior core is then fabricated by hand such as by using fiberglass and resin, and this core may be configured to include skin attachment points to allow robotics to later be attached or anchored to the skin. A fiberglass or similar material is used to form a mold from this core, and hard shells, e.g., fiberglass shells to support the skin when the robot is later assembled, are then created from this core mold.

An exterior skin can finally be formed by pouring a rubber or other flexible material into the gap between the exterior mold (with the sheet wax removed) and the core mold. After it is set, the skin is removed from the molds and placed on the supporting or hard shell(s) and attached to portions of the robotics. If modifications are desired such as to further texture a surface or to increase flexibility, the formed skin may be cut or otherwise modified manually (e.g., cut away grooves at or near a joint to increase flexing of the skin if the skin from the mold is too stiff or rigid).

As will be appreciated, conventional molded-skin approaches are very time consuming, are heavily dependent upon the skill and experience of the artisan, and are very difficult to repeat (e.g., even the same artisan will likely produce differing molds and skin systems when the process is repeated). There remains a need for improved methods for fabricating skin systems or assemblies for robotics and for other applications that involve covering a support structure with a covering or skin. Preferably such fabrication methods would be less labor-intensive than existing techniques and would support design and prototype efforts such as more efficient alteration of component shapes, sizes, materials, and the like.

SUMMARY

The present description teaches a method of fabricating a skin system or pieces/elements of such a skin system using a laser cutter or laser cutting system. Briefly, the laser cutter is controlled to perform multiple passes to selectively cut away layers of material on a surface of a sheet of skin material (e.g., a sheet of rubber, plastic, or other soft materials that may be collectively labeled "cellular foam materials"). Each layer of material to be removed by laser cutting is defined by a cut pattern, which may be stored as a digital file used by a controller of the laser cutter.

Significantly, the laser cutter is operated to cut deeper and deeper with each layer of material that is removed, and this is achieved by setting a different resolution (dots per inch (DPI)) for the laser cutter for each layer. For example, a laser cutter may be selectively controlled to operate within a resolution range (e.g., 0 to 1200 DPI or higher), and each layer defined by the same or different cut pattern is cut using a different resolution. The higher the resolution setting the more material is removed by the laser cutter, and, hence, the method includes associating lower resolution settings for the first or outer cut layers (e.g., 100 to 300 DPI for a first cut) to remove a first depth of material from the skin sheet's surface and then associating higher and higher resolution settings for second or intermediate layers (e.g., 300 to 800 DPI for a second cut) and for third or final layers (e.g., 800 to 1200 DPI for a third cut in an example that make three passes with the laser cutter). In this manner, it has been shown that a pattern or texture on a skin surface can be formed with, or so as to include, multiple depths and reaching depths of up to about 2 inches, whereas prior laser cutter control techniques generally were used to cut a pattern with a single depth (single pass) with a much shallower maximum depth (e.g., less than about 0.5 inches).

In other words, it was recognized by the inventors that a laser cutter may be controlled to perform fine detail work on a surface, up to the limit of detail that the particular cellular foam material can hold/retain. Such fine detail in a textured surface may be pores, scratches, wrinkles, or the like. Since the depth range that the laser can cut in a single pass may be very limited, the laser resolution setting may be effectively exploited or utilized in performing a cut/skin fabrication process. By increasing the DPI settings of the laser cutter, more heat energy is concentrated in the cellular foam material to provide a deeper cut on its exposed surfaces. Utilizing several passes, it is therefore possible and practical to achieve cuts of 0 to 2 inches or more in depth while also achieving accuracy. Using these control methods for a laser cutter, it is possible to automatically and repeatably pattern the surfaces of the sheet of cellular foam material. Sheets of skin material may be textured through the laser cutting process to provide a set of textured skin elements/pieces that can be assembled in an interlocking manner with adjacent skin elements/pieces having surfaces with matching and/or corresponding texturing.

More particularly, a method is provided for use in texturing cellular foam material using a laser cutter or laser cutting system. The method includes providing a sheet of cellular foam material as input to a laser cutter. Then, the method involves first controlling the laser cutter to make a first pass over a surface of the sheet cutting a first layer of a texture pattern and then second controlling the laser cutter to make a second pass over the surface of the sheet cutting a second layer of the texture pattern. When practicing the method, the laser cutter has a first resolution setting during the first controlling and a second resolution setting during the second controlling that is greater than the first resolution setting.

For example, the first resolution setting may be in the range of 0 to 300 dots per inch (DPI) while the second resolution setting may be in the range of 200 to 800 DPI. Further, the method may include third controlling the laser cutter to make a third pass over the surface of the sheet cutting a third layer of the texture pattern. In such implementations, the laser cutter will have a third resolution setting greater than the second resolution setting during the third controlling, e.g., the third resolution setting may be in the range of 600 DPI to 1200 DPI. In this manner, at least portions of the surface of the sheet will have textured components with edges defined by recessed surfaces having depths in the range of 1.5 to 2 inches after performance of the three controlling steps.

In some implementations of the method, the first layer that is cut is defined by a first dot pattern associated with the first resolution setting while the second layer is defined by a second dot pattern associated with the second resolution setting. In such cases, the first dot pattern differs from the second dot pattern. The texture pattern typically defines a plurality of texture components, and at least a number of these texture components include edges that are non-orthogonal to the surface of the sheet (e.g., are rounded or sloped/angled rather than being straight and sharp vertical edges). In practice, the first layer generally will define a first depth of the cellular foam material to be removed from the surface by the laser cutter, and the second layer will be used to define a second depth greater than the first depth of the cellular foam material to be removed from the surface by the laser cutter in the second pass over the sheet's surface.

In some cases, it may be desirable to provide differing texture effects. In such cases, during the first or second pass, optics of the laser cutter are modified to be out-of-focus (e.g. a lens removed or another modification to the optics to reduce focus), and, as a result, a beam produced by the laser cutter has reduced power and the cellular foam material is melted (rather than vaporized) during the cutting of the first or second layer of the texture pattern.

DETAILED DESCRIPTION

The present description is directed toward a method of fabricating a lightweight skin system for robotic and other mechanized and/or still characters/figures (and to systems for performing such a method). The lightweight skin systems can also be used to provide all or part of a walk-around costume worn by a person (e.g., a performer), and, in this regard, the interior texturing or pattern may be specifically designed and cut by the processes taught herein to facilitate ease of realistic movement and/or to provide enhanced ventilation through the skin to and from the performer, both of which allow the skin system or suit to be worn for a longer duration or time period.

The method involves selectively controlling a laser cutter or laser cutting system to perform multiple passes over a surface of a sheet of material selected for a skin system. Each pass is controlled to cut a predefined depth of material in a pattern associated with cut passes or layers (e.g., "first depth layer," "second depth layer," and so on), and the depth of material removed is controlled by setting the resolution of the laser cutter. Deeper cuts are achieved by using increased resolution or dots per inch (DPI) within a resolution range for the particular laser cutter, and the pattern associated with each layer may be the same or differ to provide straight wall cuts (keep pattern the same) or to provide beveled or angled cuts (differ pattern as cut deeper into the surface such as by reducing the width of a groove or the like as cut deeper to angle sidewalls of the groove).

Figure 1A:
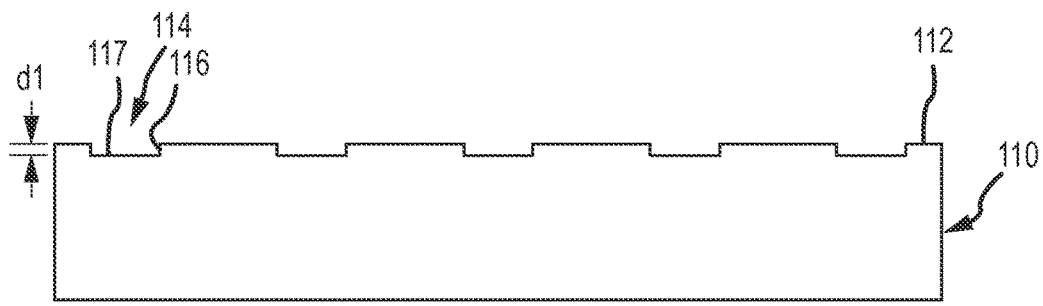
FIGS. 1A-1C illustrate three end views of a skin piece or element after three passes with a laser cutter have been used to texture a surface of the skin piece or element according to the present description.
Figure 1B:
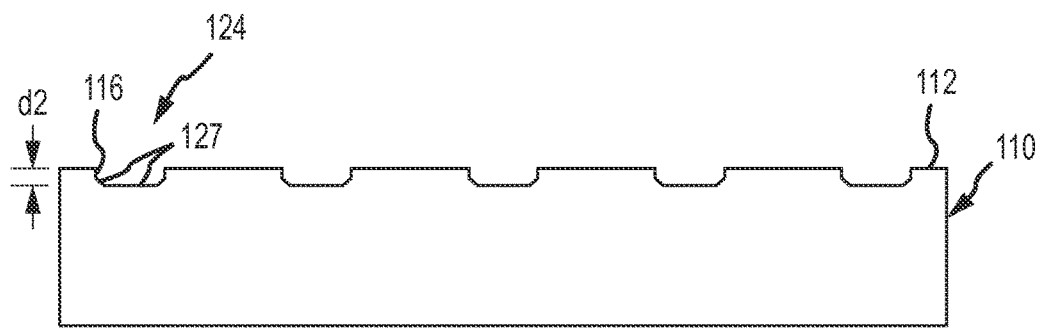
Figure 1C:
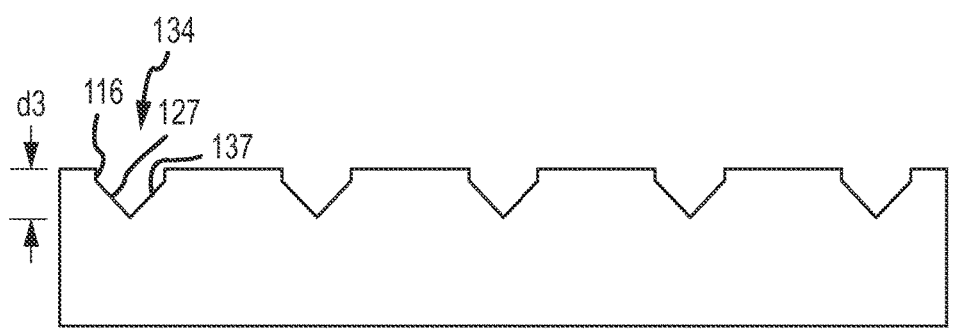

In this regard, FIGS. 1A-1C illustrate three end views of a skin piece or element 110 after three passes with a laser cutter have been used to texture a surface 112 of the skin piece or element 110 according to the present description. The skin piece or element 110 may initially take the form of a sheet of soft material (e.g., a cellular foam material) such as polyurethane, silicone, or the like from very soft to a firmer/denser configuration, and, in the past, skins formed from cellular foam material were often manually cut and shaped. In contrast, FIG. 1A shows the skin piece 110 after a first cut or pass is made by a laser cutter to remove a first layer or depth of material from the surface 112 of the skin element 110. The laser cutter is controlled to cut a particular pattern and the depth of the cut(s) is controlled by use of the laser resolution setting of the laser cutter such as by setting a first and relatively low DPI such as in the range of 0 to 400 DPI. This cuts material from surface 112 to form grooves 114 with sidewalls 116 and a bottom surface or floor 117 at a depth, $d_1$, from the surface 112.

In FIG. 1B, the skin piece 110 is shown after a second cut or pass is made by the laser cutter to remove a second layer or depth of material from the surface 112 of the skin element 110. The laser cutter in this example was operated to use a different cut pattern for this second pass or laser cutting operation and a second DPI that is greater than the first DPI setting such as in the range of 300 to 800 DPI. In this manner, a groove 124 is formed in the surface with sidewalls 116 and surfaces 127 to a new larger depth, $d_2$, relative to the surface 112 (e.g., the first depth, $d_1$, may be 0.25 to 0.75 inches and the second depth, $d_2$, may be 0.5 to 1.25 inches or the like). Further, FIG. 1C shows the skin element 110 after a third cut or pass is made by the laser cutter to remove a third layer or depth of material from the surface 112. In this example, another differing cut pattern was used for this third pass and a third DPI or resolution setting of the laser cutter was utilized (e.g., 700 to 1200 DPI). As a result, a final groove 134 is achieved with surface 116, 127 from the first two cutting operations but also one or more additional surfaces 137 that are at a third depth, $d_3$, (e.g., 1 to 2 inches or the like) that is greater than the second depth, $d_2$.

Figure 2A:
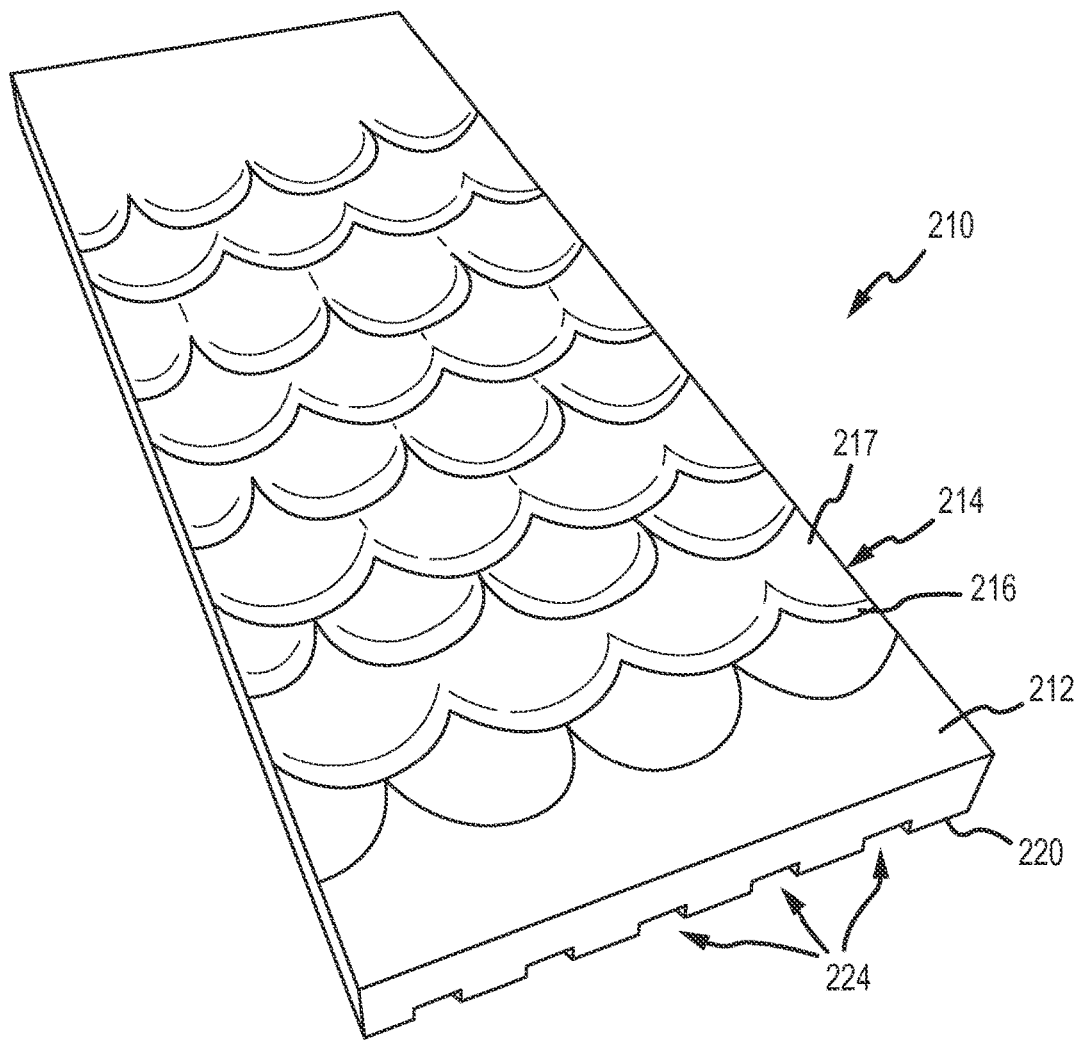
FIGS. 2A and 2B illustrate a perspective top view and a side view, respectively, of a piece or element of a skin system formed using multi-pass laser cutting as described herein.
Figure 2B:
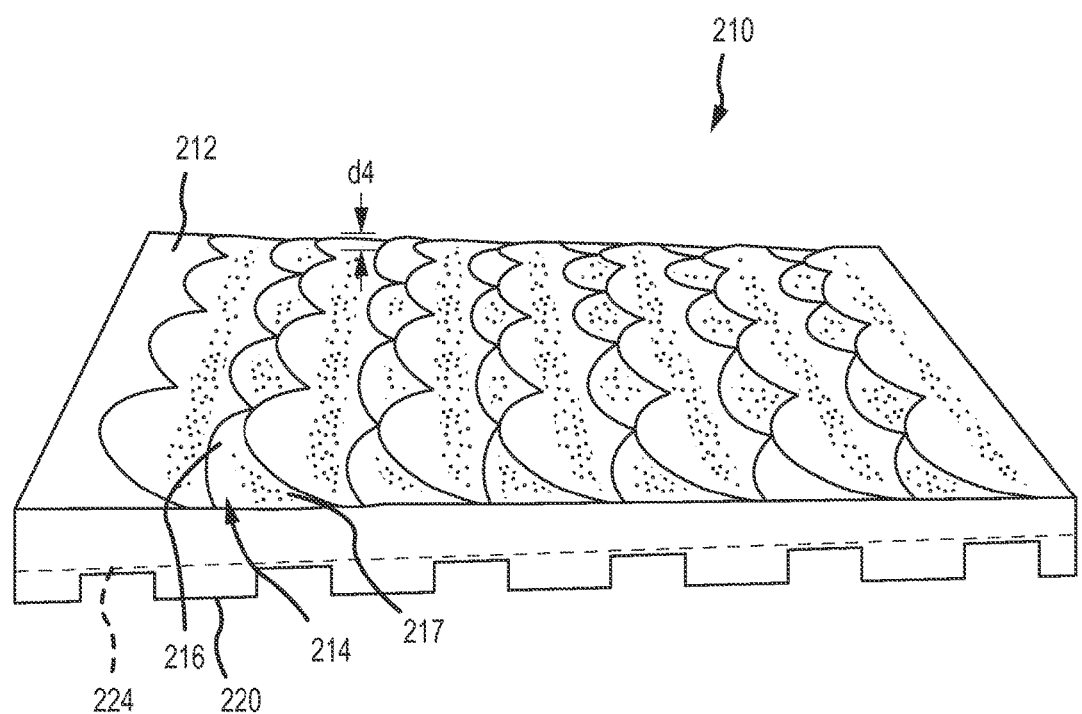

FIGS. 2A and 2B illustrate another exemplary skin piece 210 for use in a skin system such as for use with a large animatronic or robotic character. The skin piece 210 includes a first or outer surface 212 and a second or inner surface 220 opposite to the first surface 212. The inner surface 220 may be cut with a single or multiple passes to provide a number of spaced-apart grooves or channels 224 to increase the flexibility or allow easier bending of the skin system 210 in a particular direction.

The first or outer surface 212, though, is textured with a much more complex pattern that would be difficult to manually cut in a repeatable manner. As shown, the surface 212 is textured to have rows of scales 214. Each scale has a front edge 217 and a trailing edge 216 that is defined by a relatively deep circular-shaped sidewall. In practice, multiple laser cutting passes are performed by a laser cutter controlled as described herein to provide scales 214 that are beveled or angled with the leading edges 217 being cut to a depth, $d_4$, relative to the outer surface 212 and the trailing edges 216 not being defined by removal of surrounding material (e.g., to cut the next or adjoining leading edge of a scale) so as to be coplanar with the surface 212 or a small depth below this surface. In other words, the scale 214 has a body between the edges 216, 217 that has a plurality of depths relative to the outer surface 212 and the edge 216 has a nonlinear shape (e.g., semi-circular in this example). This complex texturing that combines nonlinear shapes and two or more depths to provide the texturing components (scales 214) is readily achievable and repeatable using the laser cutting control methods described herein.

The fabricating method can use a flat foam sheeting of a desired softness and thickness for a particular application. The method then involves laser cutting and, in some cases, engraving onto one or more of the surfaces of the sheeting an outer skin texture to provide a desired appearance as well as an inner skin texture to provide desired physical characteristics (amount of rigidity at a location or of flex in one, two, or more directions with grooves, channels, crosshatch patterns, and the like in other locations). The process may use software programs, such as CorelDRAW® distributed by Corel Corporation, Adobe® Photoshop® distributed by Adobe Corporation, AutoDesk® Maya® distributed by AutoDesk Inc., or other graphics software, to design the skin with its desired inner and outer texturing patterns.

Most laser cutters can be operated in two modes: raster and vector. In raster mode, it may be useful to create a bitmap of a desired skin texture (e.g., dinosaur scales or the like), where the higher parts are light pixel values and the lower parts are dark pixel values. The "sharpness" and depth of the skin texture components/features (e.g., scales in the skin of FIGS. 2A and 2B) could be adjusted by taking the laser beam in and out of focus or, alternatively, by removing the lens and using the unfocused, collimated beam. An in-focus beam provides sharper and better defined features (or edges of skin texture components/features) while an out-of-focus beam provides smoother features (e.g., more rounded or smooth edges of the skin texture components/features). The unfocused, collimated beam may provide skin texture components/features that do not vary (or not to a significant amount) in depth.

As discussed above, in many implementations, different gross depths are cut into a skin element or sheet of cellular foam material by increasing the DPI setting of the laser for each consecutive pass with the laser cutter. In vector mode, it is possible in an analogous way to create a "contour map" of the desired textured pattern or skin surface using tightly spaced lines to represent deeper areas (areas where deeper cuts are desired) and more widely spaced lines to represent shallower areas (areas where shallower cuts are desired). Passing with an out-of-focus laser cutter renders the appropriate depth because where line density is greater more laser energy is concentrated on the surface of the sheet of cellular foam material.

In a single pass cutting operation, the whole surface would have similarly sharp features, but it is typically more desirable to perform multiple passes or cutting operations such as one pass for smoothing of the textured surface, one for rough shaping of texture components/elements, and one for providing precise or well-defined edges (e.g., the trailing edges of the scales in FIGS. 2A and 2B). Lower DPI settings (in raster mode) or wider line spacing (in vector mode) remove less material while higher DPI settings (in raster mode) or tighter line spacing (in vector mode) remove more material with each pass. A combination of the two (or more) resolution settings for a laser cutter yields a wide range of depths in a textured surface that is useful for matching texturing previously only achievable by hand sculpting or molding materials for skin systems.

The inventors recognized that several novel laser cutting techniques may be used to achieve a variety of cutting and texturing effects on a surface of a sheet or piece of cellular foam material. For example, by removing optical elements from a standard laser cutter, one can create a blunt, collimated shaping beam that is analogous to a ball-nose end mill in its cutting results. This same technique also allows cutting very thick depths in foam (e.g., up to or greater than two inches in thickness), which is difficult to achieve with an off-the-shelf laser cutter. This configuration of the laser cutter (providing a blunter beam) is also useful for quickly "roughing in" a textured pattern in a surface of the sheet of cellular foam material.

A laser cutter may be controlled to perform fine detail work on a surface, up to the limit of detail that the particular cellular foam material can hold/retain. Such fine detail in a textured surface may be pores, scratches, wrinkles, or the like. The depth range that the laser can cut in a single pass may be very limited. To overcome such a limitation, the laser resolution setting is exploited. By increasing the DPI settings of the laser cutter, more heat energy is concentrated in the cellular foam material to provide a deeper cut on its exposed surfaces. Utilizing several passes, it is therefore possible and practical to achieve cuts of 0 to 2 inches or more in depth while also achieving accuracy (cut resolution/precision in the millimeter range, for example). Each pass may be thresholded from the graphic (also known as a depth map) generated by the skin designer or artist.

Using these control methods for a laser cutter, it is possible to automatically and repeatably pattern the surfaces of the sheet of cellular foam material. Sheets may be textured through the laser cutting process to provide a set of textured skin elements/pieces that can be assembled in an interlocking manner with adjacent skin elements/pieces that have surfaces with matching or at least corresponding texturing. The cutting process may include engraving markings/text/symbols into surfaces of the sheet to label and/or number each element/piece of a skin system to allow ready and accurate assembly (e.g., label a sheet with a part number and/or label edges to allow ready matching with nearby edges of other sheets of the skin system). Further, it may be useful to pattern one side of skin elements/pieces (e.g., the inner surface or the outer surface) with strain relief structures (e.g., grooves/channels in one or more direction) such as for skin system pieces or parts that move and flex after installation on a robotic or other character.

Figure 3:
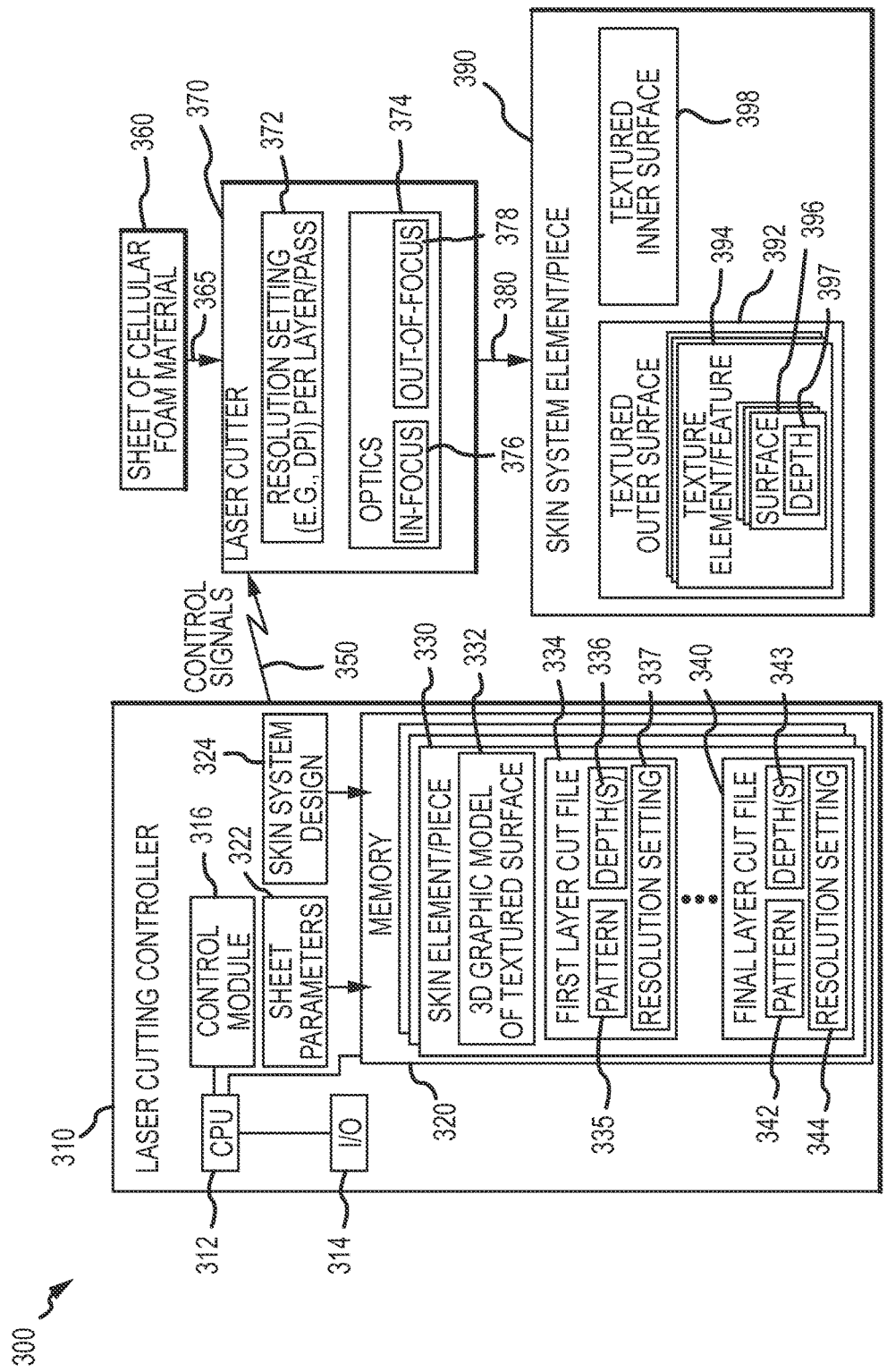
FIG. 3 is a functional block diagram of a system for performing laser cutting of a sheet of cellular foam material.

FIG. 3 illustrates, with a functional block diagram, a system 300 for performing laser cutting of a sheet of cellular foam material as taught in this description. The system 300 includes a laser cutting controller 310, which may take the form of a computer, computing device, or electronic device with processing and memory for performing functions defined by code or programs available in onboard or network-accessible memory. As shown, the controller 310 includes a processor 312 managing input and output devices 314 such as a monitor for displaying a graphical user interface (GUI), a keyboard, a touchscreen, a mouse, network and other wired and wireless communication devices (e.g., for transmitting control signals 350 to the laser cutter 370), and the like to display information to a user of the controller 310 (e.g., selectable parameters and settings for the control module 316 in defining patterns for cutting with laser cutter 370) and allowing the user to input data (e.g., selections of a textured surface design, resolution settings, and the like). The processor 312 executes code/program instructions in computer-readable media or memory to provide a control module 316 and perform its functions. The processor 312 also manages (or accesses) memory 320.

As shown, the memory 320 may store parameters defining characteristics of a sheet of cellular foam material 360 that is planned for input (as shown at arrow 365) for the laser cutter 370. For example, the sheet parameters 322 may indicate that the input sheet 360 is formed of polyurethane or silicone with a particular density and has a particular thickness (e.g., a thickness in the range of 0.5 to 3 inches or the like), which may limit how deep cuts can be to texture a surface of the sheet 360 and set how deep edge/side cuts have to be to cut the skin system element/piece 390 into a particular outer shape and size. The memory 320 is also used to store a skin system design or model 324 defining the overall skin system for use with a large scale character such as a robotic character or figure. For example, one skin system design 324 may define dimensions of a skin for a dinosaur while another defines a skin for a space creature or a famous human personality each, typically, being animated with robotics but this is not required to practice the system 300.

The control module 316 may operate to allow a user to divide the skin system 324 into a plurality of skin elements or pieces 330 that when assembled form the overall skin system 324 (e.g., a piece for wrapping around a knee of one leg, a piece for forming a neck, a piece for covering a portion of the character's back, and so on). Each of these elements/pieces 330 may be defined, in part, by a three dimensional (3D) model of each textured surface 332 such as a first 3D model of an inner surface texture pattern and a second model of an outer surface texture pattern (with each model being generated with a commercially available graphic software suite such as CorelDraw® or the like).

From the 3D model 332, the control module 316 may be used to generate a cut control file for two or more laser cut passes to be performed by the laser cutter 370. As shown, a first layer cut file 334 is generated that defines a pattern to be cut (with the pattern indicating to the laser cutter 370 when to turn on and off a beam output from its optics 374) on a surface of a sheet of cellular foam material 360. The file 334 also defines the depth(s) of cuts for the corresponding first or initial pass to form this layer of the texture pattern of model 332. Further, the cut file 334 includes a resolution setting 337, which may be a DPI value, for the laser cutter 370 (i.e., defines resolution settings on a per layer or pass basis as shown at 372 for cutter 370), and the resolution setting 337 is associated with achieving the depth 336 for this layer and may vary with the cutter 370 (e.g., its power and focus) and/or material defined by sheet parameters 322 and/or have to be established through testing of the laser cutter with the cellular foam material. Particular pattern effects may be achieved, as discussed herein, with the optics 374 of the laser cutter 370 being in-focus 376 or being out-of-focus 378 (e.g., to get a well-defined edge/cut or to get a smoother more rounded cutting/texturing, respectively), and this may be defined in the file 334, too.

Such a cut file is provided for each layer to be laser cut by a like number of passes performed by the laser cutter 370. Intermediate files are not shown but should be understood from FIG. 3. A final layer cut file 340 is provided in memory 320 for defining a pattern 342 to be cut with a final or last pass of the laser cutter 370, and the cut file includes a pattern 342, a depth value 343, and a resolution setting 344 to achieve the depth 343 with the laser cutter 370. As explained below, the patterns 335, 342 may be made up of dot patterns where the laser beam is applied to a surface of the sheet 360. The resolution settings may vary widely to practice the invention but typically increase in magnitude from the first layer setting 337 (e.g., 100 to 300 DPI) to the last or final layer setting 342 (e.g., 800 to 1200 DPI) so that depth of the removed material increases with each pass of the laser cutter 370. The number of cut files and, therefore, passes performed to cut a texture into a surface of a sheet 360 may also vary but typically will be 2 to 5 or more with three cuts being used in some present implementations used or planned for use by the inventors.

Once the files 334 to 340 are generated with the control module 316, the control module 316 may be used to issue control signals 350 tot eh laser cutter 370. In response, the laser cutter 370 performs a cutting operation or pass as defined by each layer cut file 334, 340 on a surface(s) of a sheet of cellular foam material 360 provides as input at 365 to the cutter 370. The control signals 350 are used to adjust or set the resolution setting 372 for the cutter for each pass (e.g., DPI value may be varied for each pass/cutting operation). Also, the optics 374 may be left in-focus for the cutting of the layer or be modified in an automated or manual manner prior to performing the cutting of a layer from the surface of the sheet 360. The laser cutter or laser cutting system 370 may be nearly any laser cutter device that is presently commercially available or that is offered in the coming years. Preferably, the laser cutter 370 is configured to receive control signals 350 to perform the cutting operations and is adapted for programmatic adjusting or setting a resolution (DPI) within a range (e.g., 100 to 1200 DPI or the like).

Once all the layers have been cut by cutter 370, the sheet 360 is output as a skin system element/piece 390. The skin system piece 390 includes at least one textured surface with the illustrated piece 390 having a textured outer surface 392 and also a textured inner surface 398 (e.g., textured for strain relief to define a desired amount and type of flexing or bending). The textured outer surface 392 may take a form similar to that shown in FIGS. 1A-2B and may include texture elements/features 394 (e.g., scales, feathers, wrinkles, and so on). These texture elements/features 394 each typically will have one or more surfaces 396 each cut to one or more depths 397 as defined by the 3D model 332 and provided by the multiple passes by the laser cutter 370. For example, a skin surface may include grooves with beveled or angled sides such that its surfaces have a plurality of depths or a skin surface may include scales with a deeply cut leading edge extending with a gradual sloping surface to a trailing edge at or near the depth of the original, non-textured surface.

Figure 4:
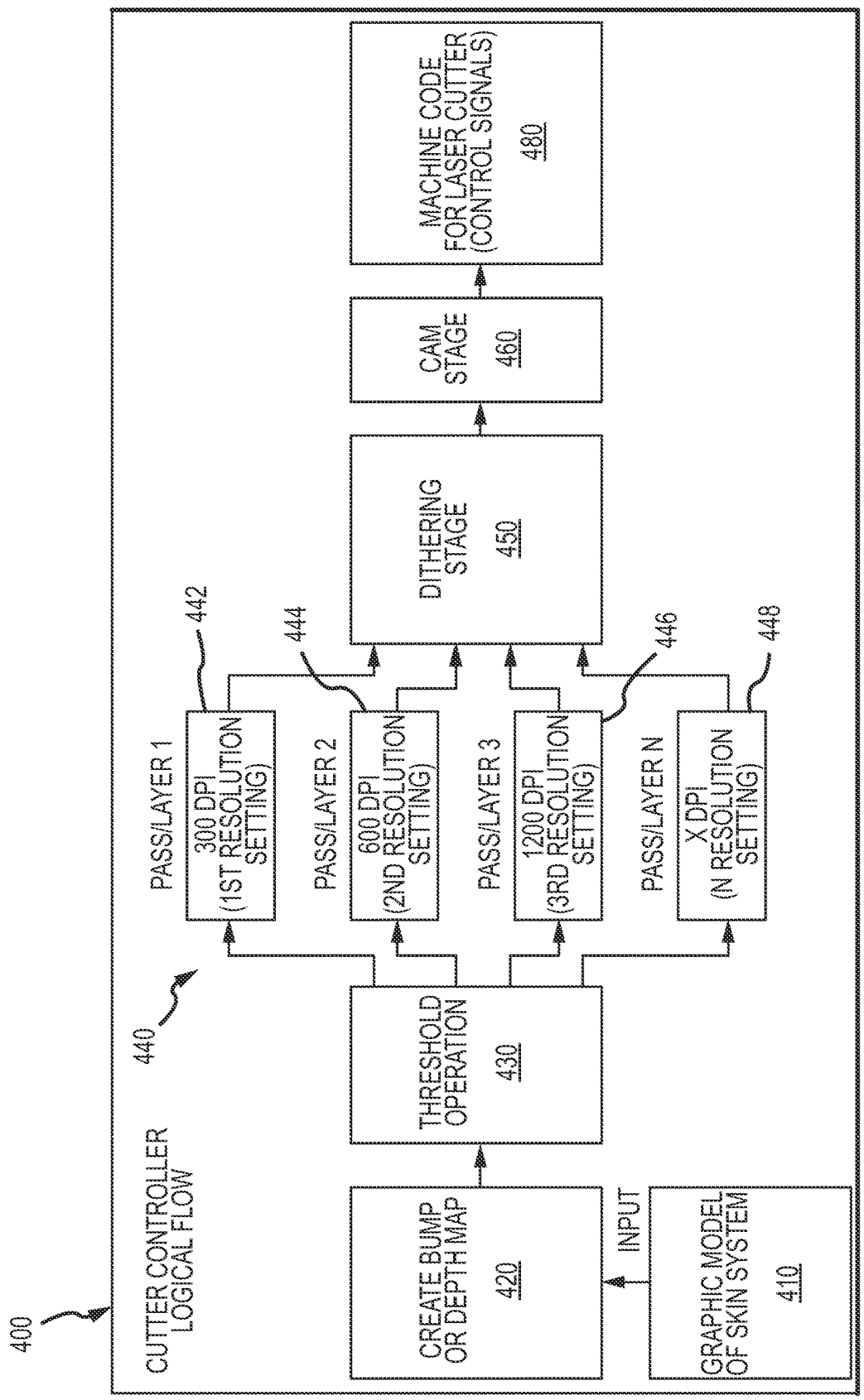
FIG. 4 is a logical flow diagram for the laser cutter controller (e.g., control module of system of FIG. 3) showing steps/functions for controlling operations of a laser controller according to the present description.

FIG. 4 illustrates a logic diagram or a functional flow diagram 400 for a laser cutter controller such as may occur during operation of the system 300 of FIG. 3 with its controller 310 and control module 316 providing control signals 350 to laser cutter 370. As shown at 410, a skin design stage or step may be performed to generate a graphics model of a skin system or a skin element with one or more textured surface, and the product (e.g., a digital file) is provided as input for stage 420 where a bump or depth map 420 is created. In step 410, conventional graphics software such as CorelDRAW or the like may be used to model a skin system and/or its individual skin elements/pieces. The input to the depth map creation stage 420 may take the form of bitmap and/or vector output from the graphics software. In stage 420, the same or a different suite of 3D software may be used to produce or render the bump map or the depth map, which may be provided as differing shades of gray.

At 430, the controller/control module performs a threshold operation, e.g., the bump map or depth map of the skin element (or full skin system) is separated or thresholded into depth ranges for feeding to a laser cutter for each pass/cutting operation (e.g., pixels are thresholded to get DPI/dot pattern such as pixels 255-200 in a first layer, pixels 199-128 in second layer, and pixels 127 to 0 in third layer, or the like). The thresholding at 430 breaks up a desired depth of a texture/cut pattern into layers or passes that each contains some fraction of the overall desired depth for a texture component. For example, a groove may have an overall depth of 1.5 inches, and each pass/layer may be assigned a fraction (equal fractions or differing fractions) such as 0.4 inches for a first layer/pass, 0.4 inches (or a total of 0.8 inches) for a second layer/pass, and 0.7 inches (or a total of 1.5 inches) for a third layer/pass.

The control flow is shown at 440 to show the output of the thresholding operation 430. At 442, a first pass/layer is shown to be assigned a first resolution setting (e.g., 300 DPI) for the laser cutter, and this setting is selected to achieve or provide the cutting in a sheet's surface to achieve the assigned fraction of the overall or desired depth for a texture pattern. At 444, a second pass/layer is shown to be assigned a second resolution setting (e.g., 500 DPI) for the laser cutter so as to achieve a second or next fraction of material removal to proceed to the overall/desired depth for the textured pattern for the sheet surface. At 446, a third pass/layer is assigned a third resolution setting (e.g., 1200 DPI or the like) for the laser cutter to provide the third fraction of material removal to arrive at the overall depth for the texture pattern. This would be continued for each layer/pass as the laser cutter may perform 2 to 10 or more passes, as is represented at 448 with the Nth resolution setting (e.g., X DPI) being assigned for controlling the laser cutter to remove the Nth fraction of material to achieve the overall depth for each feature of a particular pattern for a surface of a sheet of cellular foam material for use in a skin system.

The control flow/process 400 continues at 450 with a dithering stage that produces local dot patterns at the resolutions specified for each of the passes/layers 442, 444, 446, 448. Note, the DPI settings may also be used to "soften" or smooth edges because, in part, the use of multiple passes allows edges to be cut away in an angled or beveled manner. For example, the control process 400 could call for cutting a portion of an edge to a groove/channel or other feature away at 300 DPI in a first pass, then more away at 600 DPI, and then making a final cut/pass at 1200 DPI rather than making a single pass at 1200 DPI, and this provides a rounded edge. Note also that the potential resolution or dots per inch is available for each pass/layer, but the dithering is used to provide a dot or engraving pattern with a fraction/percentage of dots or spots in the grid or in a random arrangement to match the desired resolution (e.g., lay down only 300 DPI in a dot pattern of the possible 1200 DPI available). In this manner, each layer/pass is set up to cut deeper into the surface/material of the sheet of cellular foam material (e.g., 1 centimeter per layer or the like).

The dithering 450 is followed up in the control logic by a CAM (computer-aided manufacturing) stage 460 in which the dot patterns and, if needed, data from other steps/stages in the control flow 400 are processed to produce machine code 480 for use in controlling a laser cutter to perform passes/cutting operations (e.g., number of passes/cutting operations as shown at 440 in FIG. 4). The machine code 480 may be passed to a laser cutter to cause the cutter to cut a surface of a sheet of cellular foam material (as shown in FIG. 3), such as to control the DPI setting of the laser cutter used in each pass and to provide a dot pattern for selective operation of the laser to cut away material as the laser optics and other mechanisms of the laser cutter cause the beam to be moved (e.g., over X and Y axes of motion across the sheet's surface).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As the skin system fabricating method does not use molds to create the skin, laser cutters may be operated in a more ongoing manner, e.g., 24/7, with no need for mold downtime such as for cleaning and preparation work, which can be very time consuming in conventional skin system manufacturing processes (e.g., using electric knives, sand paper, and hot wires to texture a skin surface). The fabricating methods provide a number of other advantages. Laser cutting based on a control program (defining the patterns to cut for each layer and resolution settings (DPI settings) to achieve a desired depth) utilizes the speed and accuracy of a laser cutter or laser cutting system to etch and cut an exact texture design in flat foam sheets.

A cellular foam material sheet can be provided with a desired density and thickness, and then the laser cutting can be performed in a multiple pass manner to cut the texture design at desired depths on the surface. Further, though, the laser cutter may cut shapes (exterior sides of each piece/element of the skin system) from the sheet to provide the pieces for the overall skin system (e.g., as though one were making an article of clothing from a fabric pattern that allows a number of pieces to be stitched together after the pieces are cut from a larger swath of cloth). All the joints where the exterior sides of the cut shapes mate would fit perfectly and the overall system can be designed for the curvature of a character or figure for which the skin was designed to cover. Again, in addition to texturing of outer or exposed surfaces of the skin system, a number of the skin pieces of the skin system may be processed in another laser cutting operation to form a texture/pattern on an inner surface chosen to affect the ease in which the skin piece/element bends and/or flexes during movement of the character/figure "wearing" the skin system. For example, an animatronic dinosaur may wear a skin system with an outer surface textured with scales (as shown in FIGS. 2A and 2B), and skin pieces may also include a pattern of cut out or recessed surfaces (domes or rectangles or grooves/channels) arranged to assist in the bending of the skin system with movement of the dinosaur (e.g., at its neck or portions of its legs).

The lightweight skin systems can also be used to provide all or part of a walk-around costume worn by a person (e.g., a performer). In this regard, the interior texturing or pattern may be specifically designed and cut by the processes taught herein to facilitate ease of realistic movement and/or to provide enhanced ventilation through the skin to and from the performer, both of which allow the skin system or suit to be worn for a longer duration or time period. Hence, the skin system may have the texturing or pattern cut on either or both sides of the sheet of material (interior or exterior).

The inventors noted that most work in the past had involved increasing the power of a laser cutter and/or increasing its focus in attempts to increase the depth of cuts or materials that could be cut with a laser cutter. In contrast, the inventors recognized that it may be useful in some cutting operations with a laser cutter to use the laser cutter with its optics configured to provide an out-of-focus or less-focused beam. For example, one or more passes/layers described above can be cut with an out-of-focus beam to achieve differing texturing effects. Particularly, modifying the laser cutter's optics to cause its beam to be out-of-focus reduces power and may cause the cellular foam material to melt and provide more smooth (or at least differently shaped) edges in a cut/melted pattern. One implementation may involve removing one or more lenses from the cutter's optics so as to provide a collimated beam of out-of-focus laser light.

In some implementations, one or more of the passes or layers may be performed based on a pattern adapted or designed to mark or code a surface of the skin element or skin system. As discussed above, this may be used to allow a plurality of skin elements/pieces to be assembled onto a robotic or other character in the correct order. For example, the skin elements may be marked with a piece/part identifier (ID) and edges/sides may be marked to facilitate later assembly of the skin system (e.g., Side A of one piece lines up with Side A of another piece and so on). Hence, the laser cutter may be controlled, as part of layer/pass operations used to otherwise texture the surface or in a separate marking pass, to vaporize (cut), melt, or "mark" the textured surface of the sheet of cellular foam material. This allows the same surface of a skin element/piece that includes a textured pattern or "image" to also include text or symbols so as to provide annotations such as assembly instructions or other symbols/text that may be desirable for a skin system.

Several techniques are available to implement the systems and methods discussed in this specification. These techniques include, but are not limited to, digital computer systems, microprocessors, application-specific integrated circuits (ASIC), general purpose computers, programmable controllers and field programmable gate arrays (FPGAs), all of which may be generically referred to herein as "processors." For example, in one embodiment, signal processing may be incorporated by an FPGA or an ASIC, or alternatively by an embedded or discrete processor. Therefore, other embodiments include program instructions resident on computer readable media which when implemented by such means enable them to implement various embodiments. Computer readable media include any form of a non-transient physical computer memory device. Examples of such a physical computer memory device include, but are not limited to, punch cards, magnetic disks or tapes, optical data storage systems, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to, computer-executable instructions executed by computer system processors and hardware description languages such as Very High Speed Integrated Circuit (VHSIC) Hardware Description Language (VHDL).

We claim:

1. A method of texturing cellular foam material, comprising:

providing a sheet of cellular foam material as input to a laser cutter;

first controlling the laser cutter to make a first pass over a surface of the sheet cutting a first layer of a texture pattern; and second controlling the laser cutter to make a second pass over the surface of the sheet cutting a second layer of the texture pattern, wherein the second layer overlaps the first layer and wherein the laser cutter has a first resolution setting defining a first dots per inch (DPI) value for the laser cutter during the first controlling and a second resolution setting defining a second dots per inch (DPI) value for the laser cutter during the second controlling that is greater than the first DPI value defined by the first resolution setting, whereby the laser cutter concentrates more heat energy in the cellular foam material during the second controlling than in the first controlling to provide a deeper cut on the surface of the sheet during the second controlling.

2. The method of claim 1, wherein the first layer is defined by a first dot pattern associated with the first resolution setting and the second layer is defined by a second dot pattern associated with the second resolution setting and wherein the first dot pattern differ differs from the second dot pattern.

3. The method of claim 2, wherein the texture pattern defines a plurality of texture components and wherein at least a number of the texture components include edges that are non-orthogonal to the surface of the sheet.

4. The method of claim 1, wherein the first resolution setting is in the range of 0 to 300 dots per inch (DPI) and the second resolution setting is in the range of 200 to 800 DPI.

5. The method of claim 4, further including third controlling the laser cutter to make a third pass over the surface of the sheet cutting a third layer of the texture pattern, wherein the laser cutter has a third resolution setting greater than the second resolution setting during the third controlling and wherein the third resolution setting is in the range of 600 DPI to 1200 DPI.

6. The method of claim 5, wherein at least portions of the surface have textured components with edges defined by recessed surfaces having depths in the range of 1.5 to 2 inches.

7. The method of claim 1, wherein the first layer defines a first depth of the cellular foam material to be removed from the surface and the second layer defines a second depth greater than the first depth of the cellular foam material to be removed from the surface.

8. The method of claim 1, wherein during the first or second pass optics of the laser cutter are modified to be out-of-focus, whereby a beam produced by the laser cutter has reduced power and whereby the cellular foam material is melted during the cutting of the first or second layer of the texture pattern.

9. A method of texturing cellular foam material, comprising: providing a sheet of cellular foam material as input to a laser cutter; first controlling the laser cutter to make a first pass over a surface of the sheet cutting a first layer of a texture pattern, wherein the second layer overlaps the first layer; and second controlling the laser cutter to make a second pass over the surface of the sheet cutting a second layer of the texture pattern, wherein the laser cutter has a power setting that is used for the first controlling and for the second controlling wherein the laser cutter has a first resolution setting during the first controlling and a second resolution setting during the second controlling that is greater than the first resolution setting, whereby the laser cutter concentrates more heat energy in the cellular foam material, while at the power setting, during the second controlling than in the first controlling to provide a deeper cut on the surface of the sheet during the second controlling, wherein the first layer is defined by a first dot pattern associated with the first resolution setting and the second layer is defined by a second dot pattern associated with the second resolution setting, and wherein the first dot pattern differs from the second dot pattern.

10. The method of claim 9, wherein the texture pattern defines a plurality of texture components and wherein at least a number of the texture components include edges that are non-orthogonal to the surface of the sheet.

11. The method of claim 9, wherein the first resolution setting is in the range of 0 to 300 dots per inch (DPI) and the second resolution setting is in the range of 200 to 800 DPI and wherein the method further includes third controlling the laser cutter to make a third pass over the surface of the sheet cutting a third layer of the texture pattern, wherein the laser cutter has a third resolution setting greater than the second resolution setting during the third controlling and wherein the third resolution setting is in the range of 600 DPI to 1200 DPI.

12. The method of claim 9, wherein at least portions of the surface have textured components with edges defined by recessed surfaces having depths in the range of 1.5 to 2 inches.

13. The method of claim 9, wherein the first layer defines a first depth of the cellular foam material to be removed from the surface and the second layer defines a second depth greater than the first depth of the cellular foam material to be removed from the surface.

14. The method of claim 9, wherein during the first or second pass optics of the laser cutter are modified to be out-of-focus, whereby a beam produced by the laser cutter has reduced power and whereby the cellular foam material is melted during the cutting of the first or second layer of the texture pattern.

15. A method of texturing cellular foam material for use as a piece of a skin system for covering robotics, for use in a walk-around costume, or other uses, comprising: first controlling a laser cutter to operate at a first resolution during a pass over a surface of a sheet of cellular foam material to cut a first depth of a texture pattern; second controlling the laser cutter to operate at a second resolution greater than the first resolution during a pass over the surface of the sheet to cut a second depth of the texture pattern that is greater than the first depth and overlaps the first depth; and third controlling the laser cutter to operate at a third resolution greater than the second resolution during a pass over the surface of the sheet to cut a third depth of the texture pattern that is greater than the second depth and overlaps the first depth and second depth, whereby the laser cutter concentrates more heat energy in the cellular foam material during the second controlling than in the first controlling and more heat energy in the cellular foam material during the third controlling than in the second controlling.

16. The method of claim 15, wherein during at least one of the passes optics of the laser cutter are modified to be out-of-focus, whereby a beam produced by the laser cutter has reduced power and whereby the cellular foam material on the surface of the sheet is melted during the cutting of at least one of the depths of the texture pattern.

17. The method of claim 15, wherein the first resolution is in the range of 0 to 300 dots per inch (DPI), the second resolution is in the range of 200 to 800 DPI, and the third resolution is in the range of 600 DPI to 1200 DPI.

18. The method of claim 17, wherein at least portions of the surface, after the third controlling, have textured components with edges defined by recessed surfaces having depths in the range of 1.5 to 2 inches.

19. The method of claim 15, wherein a set of machine code is used to control the laser cutter and includes first, second, and third dot patterns associated with the first, second, and third resolutions.

20. The method of claim 19, wherein the first, second, and third dot patterns are generated from first, second, and third layers that are generated by dividing a depth map of the texture pattern into three depth-based fractions.

21. The method of claim 15, wherein the skin system comprises at least a portion of a walk-around costume and the surface is an interior surface configured for being positioned adjacent to a wearer of the walk-around costume, whereby ease of movement of the walk-around costume including the skin system or ventilation through the skin system is enhanced by the texture pattern.

* * * * *